United States Patent
Linnenbrink et al.

(10) Patent No.: US 10,233,677 B2
(45) Date of Patent: Mar. 19, 2019

(54) LOCKING MECHANISM WITH INCREASED SAFETY FEATURE

(71) Applicant: JOHNSON CONTROLS GMBH, Burscheid (DE)

(72) Inventors: Jörg Linnenbrink, Wuppertal (DE); Ingo Kienke, Wermelskirchen (DE); Jörgen Von Bodenhausen, Köln (DE); Gerhard Rothstein, Velbert (DE); Peter Grüdl, Jülich (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 315 days.

(21) Appl. No.: 14/906,036

(22) PCT Filed: Jul. 16, 2014

(86) PCT No.: PCT/EP2014/065223
§ 371 (c)(1),
(2) Date: Jan. 19, 2016

(87) PCT Pub. No.: WO2015/007767
PCT Pub. Date: Jan. 22, 2015

(65) Prior Publication Data
US 2016/0160536 A1 Jun. 9, 2016

(30) Foreign Application Priority Data

Jul. 17, 2013 (DE) .................. 10 2013 011 875
Oct. 30, 2013 (DE) .................. 10 2013 018 183

(51) Int. Cl.
E05B 77/06 (2014.01)
B60N 2/235 (2006.01)
(Continued)

(52) U.S. Cl.
CPC ............ *E05B 77/06* (2013.01); *B60N 2/2352* (2013.01); *B60N 2/42709* (2013.01); *B60N 2/43* (2013.01);
(Continued)

(58) Field of Classification Search
CPC ........ Y10T 292/0908; Y10T 29/49885; B60N 2/20; B60N 2/433; B60N 2205/20;
(Continued)

(56) References Cited

U.S. PATENT DOCUMENTS

| 3,338,733 | A | * | 8/1967 | Rowady | ................... C23C 4/08 148/526 |
| 5,577,782 | A | * | 11/1996 | Johnson | .................. E05B 81/06 292/201 |
| 2006/0181087 | A1 | * | 8/2006 | Wrobel | ............. B60N 2/01541 292/216 |
| 2010/0026013 | A1 | * | 2/2010 | Otsuka | ............... B60N 2/01583 292/121 |

(Continued)

FOREIGN PATENT DOCUMENTS

DE 10 2004 021516 A1 11/2005
DE 10 2004 025475 A1 12/2005
(Continued)

*Primary Examiner* — Mark A Williams
(74) *Attorney, Agent, or Firm* — McGlew and Tuttle, P.C.

(57) ABSTRACT

A locking mechanism (1), in a motor vehicle, includes two elements (2, 4) that abut one another along a contact region (10). At least one element (2, 4) has a coating (9) at least in the contact region. The coating alters under stress during an accident, such that the contact region (10) between the two elements becomes larger and/or a coefficient of friction between the two elements increases.

6 Claims, 1 Drawing Sheet

(51) Int. Cl.
  *B60N 2/427*  (2006.01)
  *B60N 2/42*   (2006.01)
  *B60N 2/433*  (2006.01)
  *E05B 77/02*  (2014.01)
  *E05B 77/40*  (2014.01)
  *E05B 85/00*  (2014.01)
  *B60N 2/90*   (2018.01)

(52) U.S. Cl.
  CPC ............ *B60N 2/433* (2013.01); *B60N 2/919* (2018.02); *E05B 77/02* (2013.01); *E05B 77/40* (2013.01); *E05B 85/00* (2013.01)

(58) Field of Classification Search
  CPC ...... B60N 2/43; B60N 2/4221; B60N 2/4228; E05B 85/26; E05B 77/38; E05B 77/06; E05B 77/02; E05B 81/16; Y10S 292/22
  USPC .......................................................... 292/92
  See application file for complete search history.

(56) References Cited

U.S. PATENT DOCUMENTS

| | | | | |
|---|---|---|---|---|
| 2010/0032967 | A1* | 2/2010 | Otsuka | B60N 2/01583 |
| | | | | 292/240 |
| 2012/0161455 | A1* | 6/2012 | Meyer | E05B 85/26 |
| | | | | 292/219 |

FOREIGN PATENT DOCUMENTS

| | | | | |
|---|---|---|---|---|
| DE | 10200402547 A1 * | 12/2005 | ............ | B60N 2/366 |
| DE | 600 24 420 T2 | 8/2006 | | |
| DE | 10 2006 058151 B3 | 12/2007 | | |
| DE | 10 2010 044941 A1 | 3/2012 | | |
| EP | 1 867 808 A1 | 12/2007 | | |
| EP | 1867808 A1 * | 12/2007 | ............ | E05B 85/26 |
| EP | 2 141 312 A1 | 1/2010 | | |
| JP | 2008-265484 A | 11/2008 | | |

* cited by examiner

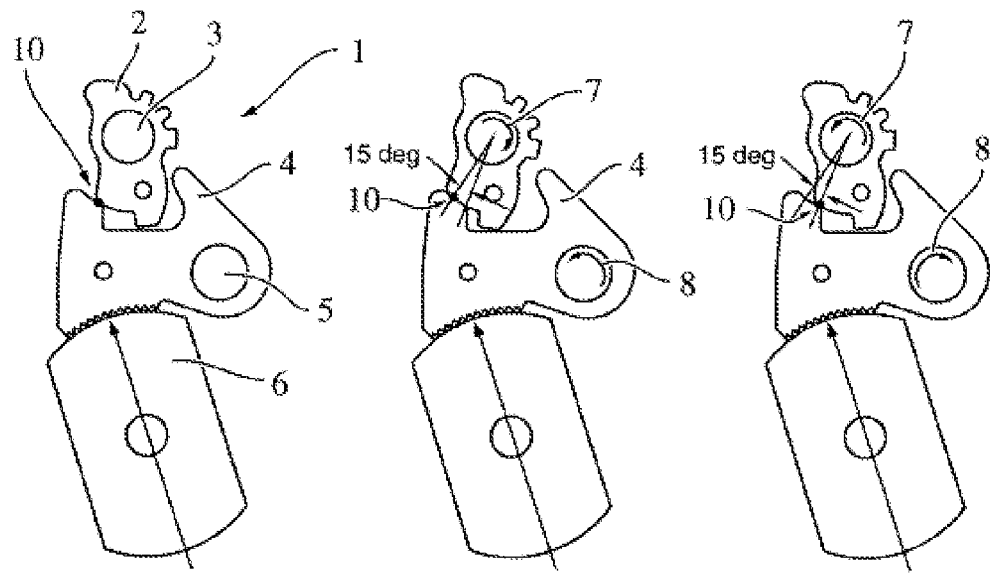
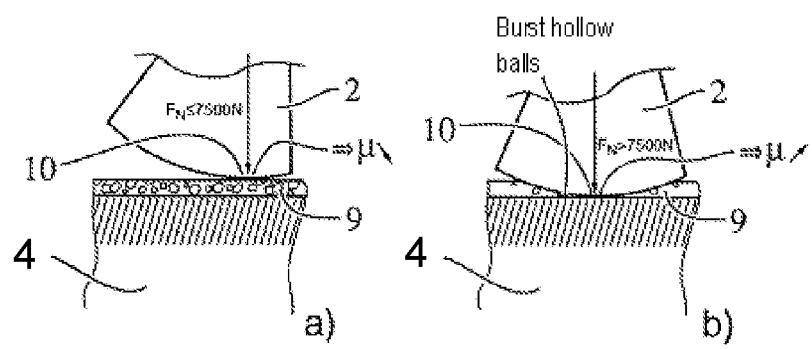
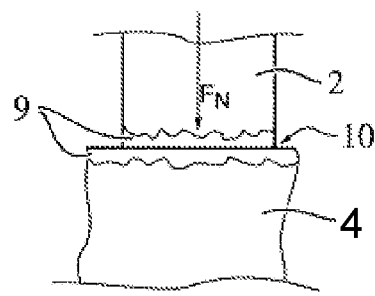

LOCKING MECHANISM WITH INCREASED SAFETY FEATURE

CROSS REFERENCE TO RELATED APPLICATIONS

This application is a United States National Phase Application of International Application PCT/EP2014/065223 filed Jul. 16, 2014 and claims the benefit of priority under 35 U.S.C. § 119 of German Patent Applications 10 2013 011 875.1 filed Jul. 17, 2013 and 10 2013 018 183.6 filed Oct. 30, 2013 the entire contents of which are incorporated herein by reference.

FIELD OF THE INVENTION

The present invention relates to a locking mechanism in a motor vehicle, in which two elements bear in a locking manner against each other.

BACKGROUND OF THE INVENTION

Locking mechanisms of this type are known from the prior art and are used in the region of car seats, for example, in order to lock the backrest to the seat part. The locking mechanism in this case is intended to be provided such that it can easily open under normal operating conditions, but remains securely in the locked position thereof in the event of an accident.

SUMMARY OF THE INVENTION

It is therefore an object of the present invention to provide a locking mechanism of this type.

The object is achieved with a locking mechanism in a motor vehicle, in which two elements bear against each other along a contact region, and wherein the elements are exposed to an operating and an accident load, wherein at least one element has, at least in the contact region, a coating which changes under the accident load in such a manner that the contact region between the two elements is enlarged and/or that the coefficient of friction between the two elements increases.

The present invention relates to a locking mechanism in a motor vehicle, in particular on a motor vehicle seat, for example in order to fasten the backrest to the seat part of the vehicle seat or to the body of the vehicle. Locking mechanisms of this type are known, for example, as a blocking latch or pawl. The locking mechanism can be transferred from a locked into an unlocked state, and vice versa. The locking mechanism is stressed in a motor vehicle both by operating loads, i.e. loads which occur during operation, even in the event of improper operation, and possibly also by accident loads and have to be correspondingly configured. Under operating loads, the locking mechanism is intended to be easy to open and, for this purpose, preferably has a special closing curve, in which the force which has to be applied in order to open the locking mechanism decreases with the distance of an element from the locking position. In the event of an accident, it has to be reliably avoided that an element leaves the locking position.

According to the invention, the locking mechanism has at least two elements which, at least in the locked state, bear against each other in a contact region. Furthermore, according to the invention, at least one element, preferably both elements, has/have, at least in the contact region, a coating which changes under the accident load in such a manner that the contact region between the two elements is enlarged and/or that the coefficient of friction between the two elements increases.

The coating preferably has a surface, which is in contact with the other element, with a low coefficient of friction, and therefore the locking mechanism is comparatively easy to open under operating loads.

Furthermore preferably, the coating has a plurality of layers, wherein the outermost layer is preferably at least partially peeled off and/or destroyed under accident loads and, as a result, releases a further layer, by means of which the contact region, i.e. the contact area, between an element and the coating and/or the coefficient of friction between an element and the coating are increased. In the event of an accident, this results in an improved form-fitting, force-fitting and/or friction connection between the two elements, and therefore said elements can at most move slightly relative to one another. For example, the released layer has a greater surface roughness than the originally outermost layer.

Alternatively or additionally, the coating can have components, for example hollow elements, in particular hollow balls, which are at least partially destroyed by the adjacent element under the accident load, as a result of which the contact area between said element and the coating and/or the coefficient of friction between said element and the coating are/is enlarged.

The coating is preferably a multi-layer system, in particular a two-layer system, for example with a comparatively hard inner layer and a comparatively soft outer layer. One example of a comparatively hard inner layer is a nickel and diamond coating which is covered by a plastics layer, for example polyamide-imide (PAI), as an anti-friction finish. The anti-friction finish provides for the comparatively low friction between the coating and the adjacent element under operating loads. The plastic preferably has a filling means, in particular an inorganic filling means, and therefore the anti-friction finish more rapidly collapses under accident loads. The contact which is then effected between the element with the inner layer leads to an increased coefficient of friction and/or to an improved force-fitting connection.

The layers can be applied in any manner customary to a person skilled in the art, for example can be deposited from the gas phase.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 shows views of the locking mechanism according to the invention;

FIG. 2 shows views of an example of the design of the surface coating; and

FIG. 3 shows a view of an example of the design of the surface coating.

DESCRIPTION OF THE PREFERRED EMBODIMENTS

FIG. 1 shows the lock according to the invention in three different states. The locking mechanism 1 according to the invention has a holder 6 which is arranged, for example, on the seat part of a vehicle seat and which has, at the one end thereof, form-fitting and/or force-fitting means in the form of teeth. This form-fitting and/or force-fitting means interact in a locking manner with complementary form-fitting and/or force-fitting means, teeth here, which are provided on the second element 4, a latching pawl here, for locking, for example, the backrest of a vehicle seat on the seat part on which the holder 6 is fastened. The second element is connected here to the backrest, for example. In order to be able to release this lock, the second element 4 is mounted rotatably about an axis of rotation 5. In the event of a rotation in the clockwise direction, the form-fitting and/or force-fitting connection between the second element 4 and the holder 6 is released. In order to secure the second element, here the latching pawl 4, in the locking position thereof, the locking mechanism has a first element 2, here a securing means, which bears in a contact region 10 against the second element 4. The first element 2 is mounted, in particular rotatably, preferably on the backrest of a vehicle seat. In the left part of FIG. 1, the initial position of the securing element relative to the latching pawl is illustrated. The form-fitting and/or force-fitting means of the second element 4, here the teeth, are in engagement with the complementary form-fitting and/or force-fitting means of the holder 6. In order to improve the securing, in order to compensate for possible play and/or in order to secure the second element 4 in the position thereof, the first element 2 is rotated in the clockwise direction, as illustrated by the arrow 7, as a result of which the second element 4 rotates counterclockwise and, as a result, the form-fitting and/or force-fitting connection between the second element 4 and the holder 6 is improved (cf. FIG. 1, middle illustration). The movement of the second element is symbolized by the arrow 8. A person skilled in the art recognizes that, when the two elements 2, 4 move relative to each other, the contact region 10 between the first and the second element 2, 4 is also displaced. The release of the form-fitting and/or frictional connection between the second element 4 and the holder 6 is illustrated in the right Figure of FIG. 1. For this purpose, the first element 2 is first of all rotated counterclockwise, which is symbolized in turn by the arrow 7. As a result, the contact region between the first element and the second element likewise migrates counterclockwise, and the second element 4, which is spring-loaded for example, can rotate in the clockwise direction about the axis 5 such that the form-fitting and/or force-fitting means on the second element 4 and the holder 6 become disengaged. The first and the second element or the kinematics thereof are preferably designed in such a manner that the contact region moves along a "closing curve", wherein the force which is required in order to move the first element relative to the second element decreases with the distance from the actual locking position (cf. middle illustration).

As can be gathered in particular from FIGS. 2 and 3, at least one element 2, 4, here the second element 4, has a coating 9 which changes under loads which occur only in the event of an accident such that either the coefficient of friction between the element 2 and the coating 9 and/or the contact region between the element 2 and the coating 9 is enlarged. This increases the force which is required in order to move the first element 2 relative to the second element 4 in such a manner that said second element can pass into an unlocking position. This firstly prevents inadvertent opening of the locking mechanism 1. Secondly, the original surface of the coating can be provided with a comparatively low coefficient of friction, and therefore the locking mechanism can be opened and/or closed under an operating load with comparatively little effort.

In the embodiment according to FIG. 2, the coating is provided in two layers and, in the outer layer thereof, has a sliding coating with a comparatively low coefficient of friction. If an accident then occurs, at least the layer which is located under the outer layer is pressed in because this inward layer has, for example, components, preferably hollow elements, in particular hollow balls, which break and/or are plastically deformed under the accident load. As a result, as can be gathered from FIG. 2b, the contact region between the two elements 2 and 4 increases and/or the coefficient of friction between the two elements increases because, for example, the outer layer is peeled off or destroyed at least in sections, and the inner layer of the coating 9 has a higher coefficient of friction. A person skilled in the art understands that it is optionally possible to dispense with the sliding coating layer, for example by the surface of the layer being smoothed, for example polished, by the components which are to break and/or plastically deform, and/or by the binder between the components having a low coefficient of friction.

FIG. 3 shows a further embodiment of the coating of the locking mechanism according to the invention. In the present case, at least one element, here both elements 2, 4, or a corresponding layer of the coating, has a comparatively high surface roughness which is at least partially covered by a further outer layer, for example a plastics layer, and therefore, under operating loads, a comparatively low coefficient of friction is produced between the two elements 2, 4 or the coatings 9 thereof. In the event of an accident, the outer layer of the coating or the coating as a whole is at least partially destroyed or peeled off from the elements 2, 4 or from the coating thereof such that the layers with the higher roughness come into contact with each other, and therefore the contact area between the two elements 2, 4 and/or the coefficient of friction between the two elements increases. A person skilled in the art understands that it may be sufficient to provide one element 2, 4 with a rough surface or a rough surface coating and with a corresponding outer layer.

While specific embodiments of the invention have been shown and described in detail to illustrate the application of the principles of the invention, it will be understood that the invention may be embodied otherwise without departing from such principles.

The invention claimed is:

1. A locking mechanism for a motor vehicle, the locking mechanism comprising:
    a holder;
    a first element;
    a second element, the second element being mounted rotatably about an axis of rotation between a released position and a locked position, the second element and the holder being disengaged in the released position and engaged in the locked position, the first element and the second element bearing against each other along a contact region, wherein the elements are exposed to an operating and an accident load; and
    a coating, wherein at least one of the first element and the second element has, at least in the contact region, the coating and the coating changes under the accident load in such a manner that the contact region between the first element and the second element is enlarged or a coefficient of friction between the first element and the second element increases or both the contact region between the first element and the second element is enlarged and the coefficient of friction between the first element and the second element increases, the coating having a plurality of layers, wherein one of the first element and the second element at least partially peels off or destroys or peels off and destroys the outermost layer of the coating under the accident load and thereby releases a further layer, as a released layer, against which said one of the first element and the second element bears, the released layer having a greater surface roughness than the original outermost layer.

2. The locking mechanism as claimed in claim 1, wherein the coating has a surface with a low coefficient of friction for allowing opening of the locking element comparatively easily under operating loads.

3. The locking mechanisms as claimed in claim 1, wherein the coating comprises two layers, with a comparatively hard inner layer and a comparatively soft outer layer.

4. The locking mechanism as claimed in claim 3, wherein the comparatively hard inner layer is a nickel and diamond coating.

5. The locking mechanism as claimed in claim 4, wherein the comparatively hard inner layer is covered by a plastics layer comprising polyamide-imide (PAI), as an anti-friction finish.

6. The locking mechanism as claimed in claim 5, wherein the plastic of the plastics layer has an inorganic filling means whereby the anti-friction finish, more rapidly collapses under an accident load.

* * * * *